Figure 1:
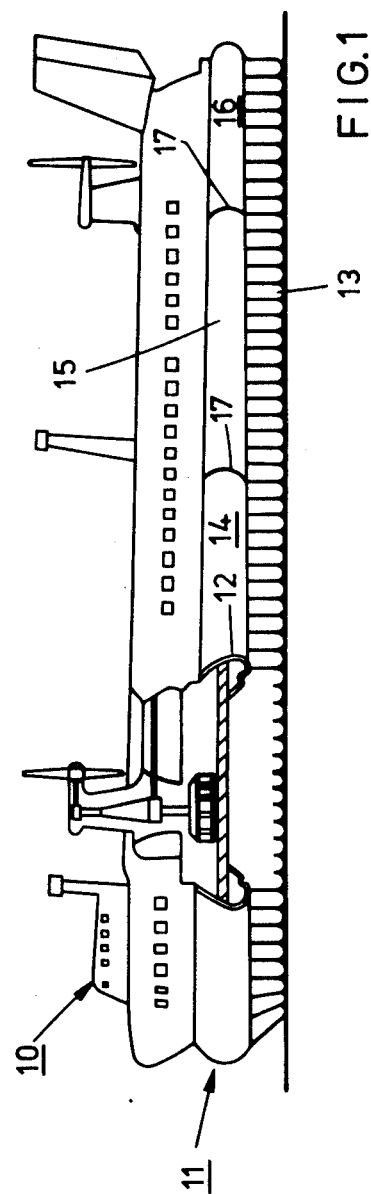

United States Patent [19]

Henry

[11] 4,056,645
[45] Nov. 1, 1977

[54] APERTURE REINFORCING MEANS FOR APERTURES IN REINFORCED FLEXIBLE MATERIALS

[75] Inventor: John Henry, Cowes, England

[73] Assignee: British Hovercraft Corporation Ltd., Yeovil, England

[21] Appl. No.: 704,634

[22] Filed: July 12, 1976

[30] Foreign Application Priority Data

July 14, 1975 United Kingdom .............. 29509/75

[51] Int. Cl.² .................. B32G 3/02; B32G 3/10; B60V 1/16
[52] U.S. Cl. .............................. 428/65; 428/64; 428/225; 428/131; 428/137; 85/50 R; 180/128
[58] Field of Search ............... 428/64, 65, 260, 245, 428/156, 174, 131, 137, 119, 120, 225; 85/50 R, 50 A–50 C; 151/35; 24/141, 142, 202; 308/3 C, 244

[56] References Cited

U.S. PATENT DOCUMENTS

| 8,902 | 9/1879 | Watters | 24/202 |
| 9,029 | 1/1880 | Acker | 24/202 |
| 2,274,010 | 2/1942 | Stellin | 151/35 |
| 2,304,155 | 12/1942 | Dyball | 85/50 R |

FOREIGN PATENT DOCUMENTS 86,691  5/1956  Norway .......................... 85/50 R Primary Examiner—George F. Lesmes
Assistant Examiner—Alexander S. Thomas
Attorney, Agent, or Firm—Larson, Taylor and Hinds

[57] ABSTRACT

An aperture in a component manufactured from reinforced flexible sheet material is reinforced with a pegged washer plate. The pegged washer plate has an apertured body portion with pegs extending therefrom, and is embedded in the flexible sheet material so that the pegs mesh with threads of a layer of material reinforcing the flexible sheet material.

8 Claims, 5 Drawing Figures

APERTURE REINFORCING MEANS FOR APERTURES IN REINFORCED FLEXIBLE MATERIALS

This invention relates to aperture reinforcing means for apertures in reinforced flexible materials, in particular reinforced flexible sheet material.

The invention is also concerned with reinforced flexible materials incorporating such means, and particularly with the use of such means in reinforced flexible sheet materials for forming sections of an air cushion vehicle flexible skirt assembly which are joined together by mechanical fastening means.

When a low strength flexible material, such as rubber, is required to carry high loads, it is generally reinforced with a fabric. One example of the use of reinforced flexible material is a skirt assembly for forming the flexible sealing means that retards the escape of air from a pressurized cushion of air supporting an air cushion vehicle above a surface over which it operates.

Present-day flexible skirts are generally made from neoprene-coated nylon fabric, the nylon fabric providing strength, and the rubber coating providing flexibility and impermeability to the passage of air. The shape, size and design of a skirt assembly generally gives rise to a requirement that it be made in a number of sections which are subsequently joined together. As far as possible bonding techniques are used, since these produce lighter weight joints and reduce damage caused by mechanical fastening means. However, where it is necessary to remove a section of the skirt for replacement or repair when it is damaged or becomes worn, bolted joints are used.

The transfer of high loads through these bolted joints gives rise to problems, since only one or two threads of the reinforcing fabric material, which carries the major portion of the load, are in contact with each bolt. The loads are not, therefore, adequately transferred from the material to the bolts and from the bolts to the material at these joints. This can give rise to elongation of the bolt holes in the reinforced flexible material, which may result in failure of the joint.

One aspect of the present invention provides aperture reinforcing means for reinforced flexible material comprising a pegged washer plate including an apertured body portion having two opposed substantially parallel surfaces, and a plurality of pegs spaced around the aperture so as to extend outwardly from at least one of the opposed parallel surfaces of the body portion.

The pegs may be of constant cross-section over a substantial part of their length. Alternatively, they may taper from a maximum cross-section at their junction with the body portion.

Preferably the pegs are integral with the body portion which may be formed as a flat disc having a central aperture. The pegs may be equispaced around concentric pitch circles with respect to the aperture, or alternatively, they may be staggered and on varying pitch circle diameters with respect to the aperture.

The pegged washer plate may be manufactured from metal or a suitable plastics material such as nylon.

In use the pegged washer plate is incorporated within reinforced flexible material during manufacture thereof, at a desired location of an aperture, so that the pegs mesh with the reinforcing material.

One form of washer may have pegs extending from both faces of the body portion so that it is able to mesh with sheets of reinforcing material positioned on both sides of the body portion.

Another aspect of the invention provides a component manufactured from at least one layer of a reinforcing material embedded within an elastomeric material and having at least one aperture provided with aperture reinforcing means comprising a pegged plate washer, an apertured body portion having two opposed substantially parallel surfaces and a plurality of pegs spaced around the aperture in the body portion so as to extend from at least one of the opposed surfaces to mesh with the reinforcing material.

The reinforcing material may be a fabric of woven or knitted construction, and the pegs on the washer may be located in the interstices of the woven or knitted threads.

In operation, when the reinforced flexible material is placed under load, the pegs will pick up the load being carried by those threads of the reinforcing material with which they are in contact and will transmit these loads to the body of the washer. From the body of the washer the loads are transmitted to a bolt or other fastening device passing through the aperture.

Similarly, the load in a bolt or other fastening device may be transmitted into the body of the washer and then through the pegs into the reinforcing material.

Means in accordance with the invention finds particular application in reinforced flexible material in sheet form, and in particular where two or more sheets of material have to be joined together by bolted lap joints.

An advantageous application, therefore, is in flexible skirt assemblies for air cushion vehicles where sections of the skirt made from sheet material are fastened together by bolted lap joints which may be required to transmit very high loads.

Accordingly another aspect of the invention provides an air cushion vehicle flexible skirt assembly comprising at least two sheets of reinforced flexible material fastened together by a bolted joint, each sheet having a plurality of holes in each sheet for locating the bolts, aperture reinforcing means embedded in each sheet at the location of each hole for transmitting loads from the sheets into each bolt and for transmitting loads from each bolt into the sheets, said aperture reinforcing means comprising for each hole a pegged plate washer having a flat body portion defining a hole aligned with the hole in the sheet, and a plurality of pegs extending from one face of the body portion to mesh with the reinforcing material of the reinforced flexible material.

In one form of flexible skirt assembly in accordance with the invention the reinforced flexible material comprises a layer of woven nylon fabric embedded within neoprene rubber. The pegs on the pegged washer plate are located in the interstices between warp and weft threads of the nylon fabric at a location where it is desired to form an aperture in the finished material. A sheet of neoprene rubber is then laid onto both faces of the nylon fabric and the assembly is heat bonded in a press so that the neoprene rubber permeates into the interstices of the nylon fabric.

Figure 2:
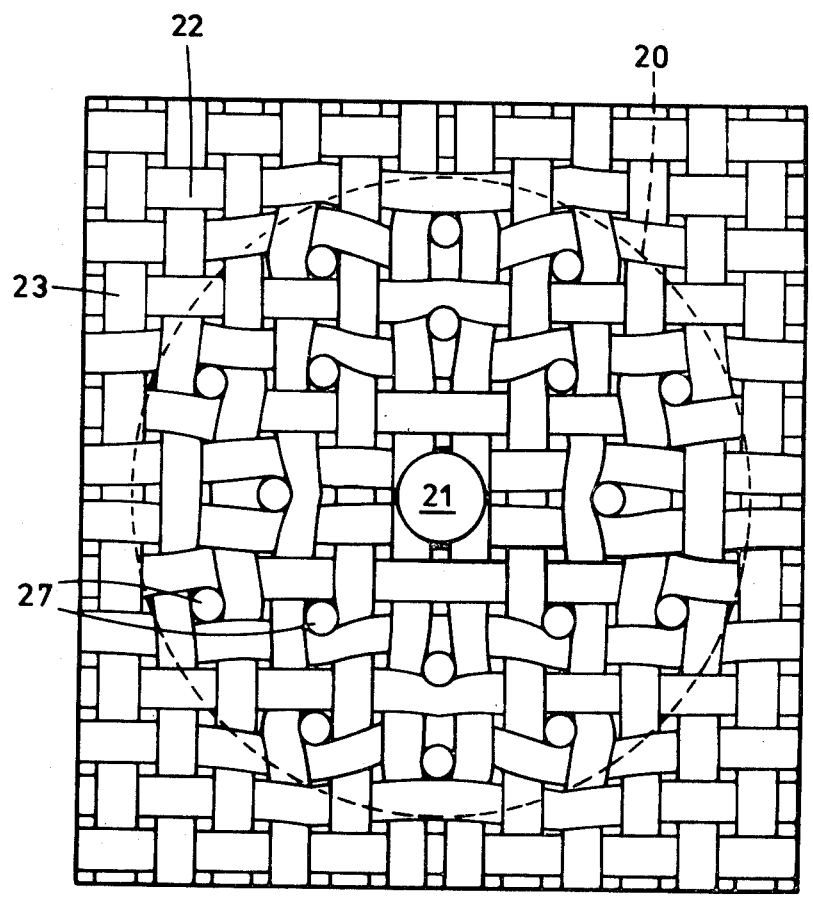
Figure 3:
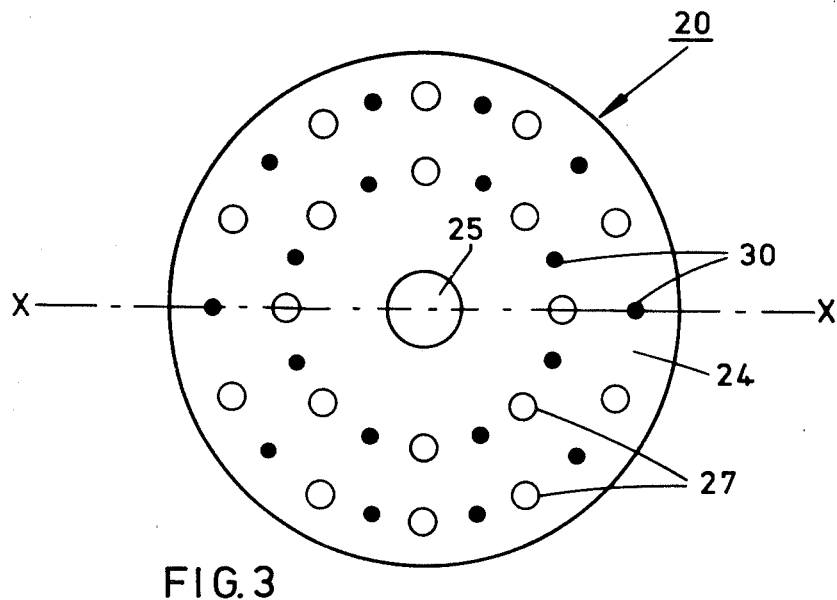
Figure 4:
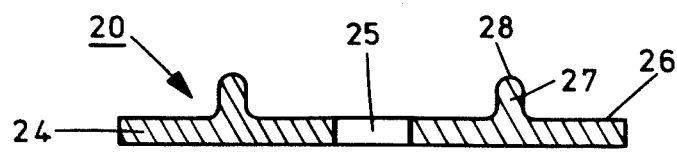
Figure 5:
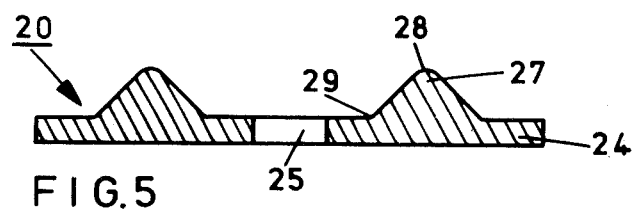

The invention will now be further described by way of example only with reference to the accompanying drawings in which:

FIG. 1 is a side elevation of an air cushion vehicle having a cushion containing flexible skirt, FIG. 2 shows a pegged washer plate in accordance with the invention co-operating with the threads of a section of woven reinforcing material, FIG. 3 is a view in plan of a pegged washer plate, FIG. 4 is a section on line X—X in FIG. 2 of one form of pegged washer plate in accordance with the invention, and FIG. 5 is a section on line X—X in FIG. 2 of another form of pegged washer plate in accordance with the invention.

An air cushion vehicle 10, shown in FIG. 1, has a cushion containing flexible skirt 11 comprising a bag member 12 with a plurality of individual flexible skirt elements 13 depending downwardly therefrom. The bag member 12 is formed from a plurality of sections of reinforced flexible sheet material, for example sections 14, 15 and 16, joined together in end to end relationship by bolted lap joints 17.

In forming a section of the bag member 12, a sheet of woven nylon fabric material is cut to a desired size and shape, and laid between two sheets of uncured rubber cut to a similar size and shape. This assembly is then placed in a press and subjected to heat and pressure. The rubber permeates between the interstices of the threads of the nylon fabric to form a homogeneous sheet of reinforced flexible material.

Prior to the present invention holes were then punched in the material with a suitable cutting tool to facilitate bolting together of the sections to form the complete bag member. This gave rise to problems in the bag members for very large air cushion vehicles since the high loads that have to be carried by the reinforcing fabric cannot adequately be transferred through the one or two threads that are in contact with each bolt.

This problem is substantially overcome in the present invention by providing aperture reinforcing means comprising a pegged washer plate 20 at the location of each bolt hole 21 in the reinforcing fabric so as to mesh with the warp and weft threads 22 and 23, respectively, as shown in FIG. 2.

As shown in FIG. 3, the pegged washer plate 20 has a body portion 24 formed as a flat disc with a central aperture 25. Projecting outwardly from one face 26 of the disc are two concentric rings of pegs 27. The pegs 27 are formed integrally with the body portion 24 so that the pegged washer plate is conveniently manufactured by an injection moulding process from any suitable metal or a plastics material.

In one embodiment, as shown in FIG. 4, the pegs 27 are of constant diameter with radiused tip ends 28. One such pegged washer plate suitable for meshing with a 30 oz./square yard woven nylon fabric has a body portion formed as a disc 1.7 inches in diameter and 0.08 inch thick, with a central aperture of approximately 0.33 inch diameter. The pegs are 0.08 inch diameter and extend from the face of the body portion by a distance of 0.14 inch. The pegged washer plate shown meshing with the woven nylon fabric in FIG. 2 has an outer ring of 10 pegs equispaced on a 1.4 inches pitch circle diameter and an inner ring of 8 pegs equispaced on a 0.46 inch pitch circle diameter. It will be seen from FIG. 2 that the warp and weft threads, 22 and 23 respectively, have to be deformed slightly in order that the pegs 27 may be located in their interstices. It will also be seen from FIG. 2 that the pegs 27 locate with alternate interstices that are positioned approximately on their pitch circle diameters. If desired, additional pegs 30 may be provided, as shown by the black dots on the pegged washer illustrated in FIG. 3, so that a peg is located in each of the interstices lying on the pitch circle diameters of the pegs.

In manufacturing a component the pegged washer plates are positioned on the reinforcing fabric at those locations where it is desired to form apertures in the finished component, so that the pegs mesh with the interstices of the warp and weft threads. The fabric is then laid between sheets of uncured rubber and the assembly is cured under heat and pressure. When the curing process is complete the material covering and filling the aperture in each of the pegged washer plates is cut away to form the apertures in the finished component.

It has been found that when used in areas subject to high fluctuating loads, the pegs of washer plates constructed to be of the form shown in FIG. 4 may be liable to fail in fatigue. Pegged washer plates for use in such areas may be constructed to be of the form shown in FIG. 5, the fatigue strength of each peg 27 being increased by tapering it from a smaller diameter at the tip end 28 to a larger diameter at the root end 29. In one example of this form of pegged washer plate the diameter at the peg root is three times the peg height; the end radius of the peg tip is equal to the peg root diameter; and the internal angle formed by the peg and the face of the washer plate is 45°.

Of course, the embodiments hereinbefore described with reference to and shown in the accompanying drawings are by way of example only, and a number of modifications can be made without departing from the scope of the invention. For instance, the pegs which have been described as being spaced in two concentric rings, could be positioned at various radial dimensions from the centre of the aperture in the body portion so that they can be located in the interstices between the threads of the reinforcing material without deforming these threads.

Although the reinforcing material has been described as being of a woven construction, a reinforcing material of knitted construction could be used.

Furthermore, although a reinforced flexible sheet material has been described that is reinforced by a single sheet of reinforcing material, two sheets of reinforcing material could be used. When used with a reinforced flexible sheet material having two layers of reinforcing material a pegged washer plate may have pegs extending from both faces of the body portion so that the pegs on one side of the body portion mesh with one of the sheets of reinforcing material, and the pegs on the other side of the reinforcing material mesh with the other sheet of reinforcing material.

I claim as my invention:

1. In a component manufactured from at least one layer of a reinforcing fabric material embedded within an elastomeric material and having at least one aperture extending through the elastomeric and reinforcing materials, aperture reinforcing means embedded within the elastomeric material at the location of the or each aperture, said means comprising a pegged washer plate including an apertured body portion having two opposed substantially parallel surfaces and a plurality of pegs spaced around the aperture in the body portion so as to extend outwardly from at least one of the opposed parallel surfaces to mesh with the reinforcing material.

2. A component having aperture reinforcing means as claimed in claim 1, wherein the individual pegs of each pegged washer plate taper inwardly from a maximum cross-section at their junction with the body portion.

3. A component having aperture reinforcing means as claimed in claim 1, wherein the individual pegs of each pegged washer plate are of constant cross-section over a substantial part of their length.

4. A component having aperture reinforcing means as claimed in claim 1, wherein the pegs of each pegged washer plate are integral with the body portion.

5. A component having aperture reinforcing means as claimed in claim 1, wherein the body portion of each pegged washer plate is formed as a flat disc having a central aperture.

6. A component having aperture reinforcing means as claimed in claim 5, wherein the pegs of each pegged washer plate are equispaced on concentric pitch circle diameters with respect to the central aperture.

7. A component as claimed in claim 1, wherein the reinforcing material is a woven fabric.

8. A component as claimed in claim 1, wherein the reinforced material is a section of a bag member.

* * * * *